US006986283B2

(12) United States Patent
Mills et al.

(10) Patent No.: US 6,986,283 B2
(45) Date of Patent: Jan. 17, 2006

(54) METHOD AND APPARATUS FOR EXCHANGING FLUID IN A TRANSMISSION SYSTEM

(75) Inventors: Richard Mills, LaPorte, IN (US); Walter Murray, Pioneer, OH (US); William Brown, Bryan, OH (US); John E. Flaherty, Canton, MI (US)

(73) Assignee: SPX Corporation, Charlotte, NC (US)

( * ) Notice: Subject to any disclaimer, the term of this patent is extended or adjusted under 35 U.S.C. 154(b) by 269 days.

(21) Appl. No.: 10/178,526

(22) Filed: Jun. 25, 2002

(65) Prior Publication Data

US 2003/0233874 A1    Dec. 25, 2003

(51) Int. Cl.
*G01F 7/00*    (2006.01)
(52) U.S. Cl. ........................................................ 73/196

(58) Field of Classification Search .................. 73/196, 73/197; 184/1.5, 106; 141/98, 65
See application file for complete search history.

(56) References Cited

U.S. PATENT DOCUMENTS

| 5,626,170 | A  | * | 5/1997 | Parker ........................... 141/98 |
| 6,374,872 | B1 | * | 4/2002 | Tarabocchia ................. 141/98 |
| 6,378,657 | B2 | * | 4/2002 | Viken ........................... 184/1.5 |
| 6,553,827 | B2 | * | 4/2003 | McCormick ................. 73/196 |

* cited by examiner

*Primary Examiner*—Harshad Patel
(74) *Attorney, Agent, or Firm*—Baker & Hostetler LLP

(57) ABSTRACT

Method and apparatus are provided to exchange fluid in a system such as a transmission system. Supply and return flow rates are measured and can be adjusted based on a difference between the flow rates.

24 Claims, 3 Drawing Sheets

METHOD AND APPARATUS FOR EXCHANGING FLUID IN A TRANSMISSION SYSTEM

FIELD OF THE INVENTION

The present invention relates generally to the field of apparatus and methods for replacing and/or exchanging fluids. More particularly, the present invention relates to an apparatus and method for replacing and/or exchanging fluid in automatic transmissions. These transmissions may have sealed or inaccessible hydraulic torque converters. These transmissions may also include a fluid circulating pump and inlet and outlet ports for circulation of the hydraulic transmission fluid to fluid coolers and the like.

BACKGROUND OF THE INVENTION

Many consumer and industrial vehicles use automatic transmissions filled with automatic transmission fluid (ATF) as the working fluid and to aid in cooling the transmission. In typical configurations, automatic transmissions are equipped with a cooling system, such as an oil cooler, that may be located, for instance, inside an automobile radiator. The automatic transmission fluid is cycled through the oil cooler to regulate its temperature and then back into the transmission in order to keep the transmission cool.

The importance of maintaining fresh and clean transmission fluid is essential in keeping the transmission cool. At regular intervals, the automatic transmission fluid should be removed from the transmission and replaced with fresh fluid. Lack of proper service can cause transmission problems due to the fact that old ATF may no longer meet the manufacturer's specification for performance against rust or harmful attack by corrosive acids that can lead to a breakdown of the metal and aluminum parts in the vehicle's oil cooler or transmission. Furthermore, entrained contaminants and debris contained within old ATF, not fully removed by the transmission's filter assembly, can clog the oil cooler, the result of which is that proper ATF flow through the oil cooler and to the transmission is prevented. Improper ATF flow can cause the transmission to overheat and produce serious, if not, permanent damage.

Many conventional machines and methodologies presently exist for withdrawing the used ATF from an automotive automatic transmission while simultaneously replacing the used fluid with new fluid. These devices and methods are a response to the widely-held recognition that simply dropping the pan from an automatic transmission while doing a filter change (or draining the pan of those transmissions fitted with a drain plug) and then refilling the transmission to the proper level with new fluid results in more than half of the old contaminated ATF remaining in the transmission.

Such is the case because, for example, the clutch actuators, control valves, pump(s), ATF cooler and connecting conduits, and torque converter of the transmission still hold old ATF. In order to extract this old ATF from the transmission, the vehicle engine and transmission must be operated while a fluid exchange for the transmission is in progress.

The vehicle engine can be run with the transmission in "neutral" or "park", with most of the old ATF being exchanged in this way (i.e., without the drive wheels spinning or the transmission clutches being cycled). In this latter case, the old ATF will still be flushed from the torque converter, ATF cooler, and connecting conduits of the transmission system.

Unfortunately, this operation of the vehicle engine creates a risk that the transmission can be damaged or destroyed by dry running. That is, if the old transmission fluid is drained out, and the transmission is not simultaneously refilled with sufficient new fluid so that the fluid level in the transmission drops too low, then the transmission can be damaged by dry running. In this case, the new transmission fluid may be allowed to partially or completely drain out (perhaps while an attendant is distracted or absent for some reason), and the transmission can be damaged. To be done safely, this method requires full-time attention to both monitor the draining ATF and to infuse new ATF back into the transmission. Obviously, this method can be both labor intensive and prone to error.

In other situations, the supply of new ATF available to the service machine may be inadequate or may have been allowed to run completely out of the service machine to begin with. (For example, the attendant may not check to see that a reservoir for new ATF actually holds an adequate supply.) Again, a sufficient infusion of new ATF into the transmission may not take place during the service procedure, possibly resulting in damage to the vehicle transmission.

Furthermore, an external power failure to the transmission service machine may occur during the service process, with the vehicle under service still running. This may result in the vehicle running without sufficient ATF in the transmission or with its external transmission cooler loop open and the fluid from the transmission being pumped to waste. Again, transmission damage can result unless an attendant catches this situation early enough to prevent sufficient damage.

Accordingly, a desire and a recognized need exists to safely and economically effect the replacement of used ATF with new ATF in an automatic transmission. Unfortunately, many of the machines and methods presently existing for this purpose suffer from one or more of the deficiencies identified above. Additionally, such machines and methods are complex in their construction and operation.

SUMMARY OF THE INVENTION

The foregoing need has been met by the present invention. The apparatus and method of the present invention may be used to change automatic transmission fluid (ATF) from an automotive automatic transmission. The invention relates in some embodiments to a fail-safe machine and to a method of its operation and use in exchanging the used ATF of an automatic transmission with fresh ATF. Furthermore, the machine is very economical in its construction, energy efficient in its operation, environmentally responsible, and easy for an automotive technician to use.

In one aspect of the invention, a method is provided to flush a cooling system. The method includes pressurizing a fluid to create a fluid flow into the transmission system. A first and second fluid flow rate is measured prior to and after fluid enters and leaves the transmission system respectively. These rates are compared to find a difference between the first and second fluid flow rates to determine whether the difference exceeds a predetermined value. The method further includes adjusting the first fluid flow rate if the difference exceeds the predetermined value.

In another aspect of the invention, a fluid exchanging device is provided including a means for pressurizing a fluid to create a fluid flow into a transmission system. The device also provides a means for measuring a first fluid flow rate prior to fluid flow entering the transmission system. Similarly, a means for measuring a second fluid flow rate after the fluid leaves the transmission system is also provided. To find a difference between the first and second flow rate, a means for comparing the fluid flow rates is provided. The device also includes a means for determining whether a difference between the fluid flow rates exceeds a predetermined value. The device further provides a means for adjusting the first fluid flow rate if the difference exceeds the predetermined value.

In another aspect of the invention a cooling system fluid exchange apparatus is provided including a fluid supply line capable of supplying fluid from a fluid supply tank to one of a cooling system or transmission system. The device also provides a fluid return line capable of directing fluid from one of the cooling system or transmission system to a waste receptacle. Attached to the supply line is first flow transducer that measures a supply flow rate. Similarly, attached to the return line is a second flow transducer that measures a return flow rate. A processor connects to the first and second flow transducers that comprise the supply and return flow rates.

In another aspect of the invention, a cooling system fluid exchange apparatus is provided including a fluid supply tank and a controlled air pressure system that pressurizes the supply tank. The apparatus further provides a fluid supply line, connected to the supply tank, and a fluid return line. Coupled to the fluid supply line is a first check valve, a proportional flow control solenoid and a first flow transducer. Coupled to the fluid return line is a second flow transducer. The device also includes a processor which connects to the first and second flow transducers and the proportional flow control solenoid.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
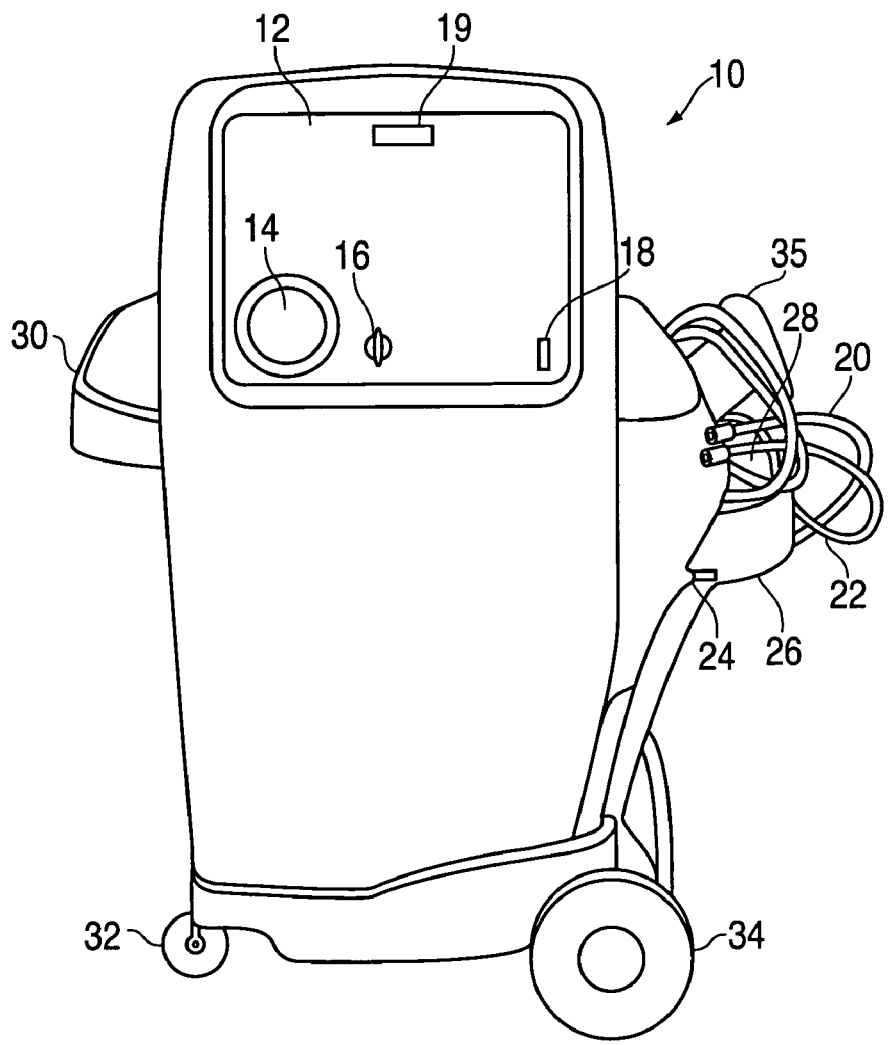
FIG. 1 is a perspective view of the front of a flushing cooling system in accordance with a preferred embodiment of the present invention.

The present invention provides an apparatus, as depicted in FIG. 1, for testing flow to a transmission fluid cooling system and/or a transmission, flushing the cooling system and/or exchanging transmission fluid. The device 10 includes a stamped steel skeleton with a plastic exterior shell. The interface 12 allows an operator to set the device for performing a variety of functions by selecting an operating mode. The selected mode allows the device to perform one of either a fluid flow testing operation, a cooling system flushing operation, or a fluid exchange operation.

In the flow testing mode, the apparatus acts as a flow diagnostic machine by determining whether fluid flowing from an independent source is properly flowing through a cooling system. In the flushing mode, the apparatus provides turbulence to the fluid flow and performs a flushing operation. In the fluid exchange mode, the apparatus compares flow entering and leaving a transmission and adjusts the rate of flow accordingly as it simultaneously exchanges old ATF with clean ATF.

In operation, an operator fills the device with fluid through the fill port 14. An operating mode is selected by setting the knob selector 16 and the device is powered on by switch 18. An LED display 19 exhibits information such as fluid flow rate, transmission fluid temperature, low battery indicator for an insufficiently charged 12 volt supply source, incorrect hook-up warning, and fluid level in the supply tank.

As further shown in FIG. 1, external quick disconnect fluid hoses 20, 22 are available for connecting to a cooler system or other part of a transmission system depending upon the selected operating mode. In a preferred embodiment of the invention, one hose 20 typically serves as a clean ATF supply line connecting to a cooling system, e.g., an oil cooler. The other hose 22 serves as an ATF return line back into the device to direct discharged ATF into a waste receptacle 26. An external compressed air supply source is connected to an air intake fitting 24. Trays 28, 30 provide convenient storage containers for tools and equipment. The entire device 10 is portable and maneuverable by attached wheels 32, 34 and handle 35.

Figure 2:
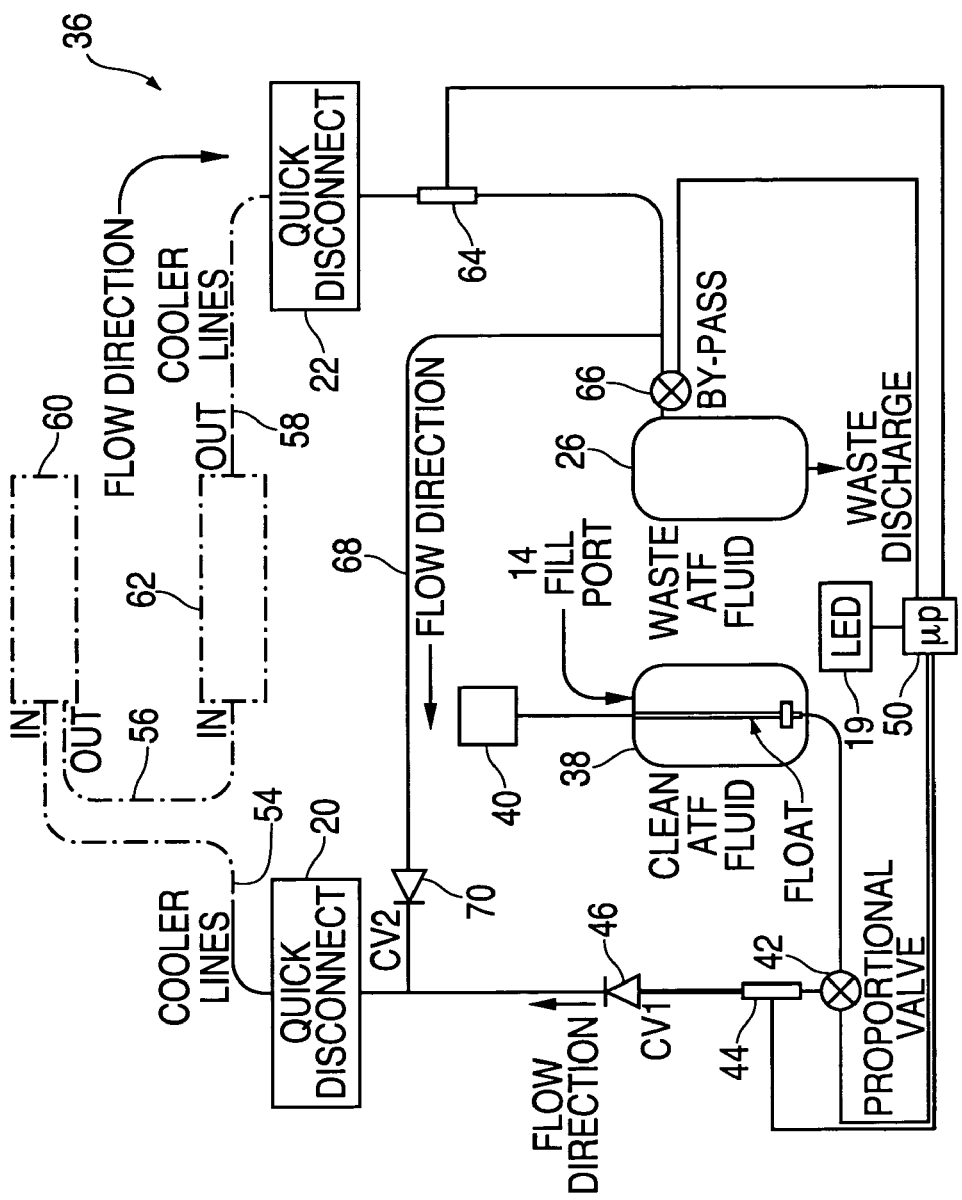
FIG. 2 is a block diagram of the connection of the feed hoses during setup of the fluid exchanging system of FIG. 1.

Referring now to FIG. 2 an illustrative set-up connection is depicted for performing the method of one preferred embodiment of the invention. As shown, a block diagram 36 of the device for exchanging fluid in a transmission system 60 is depicted. Compressed air 40 is provided by an external source to supply air through the air intake fitting 24, FIG. 1, into a steel supply tank 38. The tank also receives ATF from the fill port 14. The supply line hose 20 is connected to the tank and delivers ATF to the transmission system 60. Coupled to the supply line hose 20 is a first check valve 46, a proportional flow control solenoid 42, and a first flow transducer 44. Processor 50 is connected to the flow transducer 48, and proportional flow control solenoid 42.

In the setup depicted in FIG. 2, the source of clean ATF is connected to the supply line hose 20 of the device, and the supply line hose is further connected into the line in side 54 of the transmission system 60. The line out side of the transmission system 60 is connected 56 to the line in side of a cooling system 62. The line out side 58 of the cooling system 62 is connected to the return line hose 22 of the device 10. The return line hose 22 is further configured to connect into the device's waste receptacle 26. Connected in this manner, used ATF fluid from the transmission system 60 is allowed to flow into the waste receptacle 26 during the fluid exchange operation.

Additional components coupled to the return line hose 22 include a second flow transducer 64, and a by-pass valve 66. The processor 50 is also connected to the second flow transducer 64 and by-pass valve 66.

The device 10, additionally, provides a closed loop circulation feature by way of a feedback return line hose 68. The feedback return line hose 68 is configured to tap into the return line hose 22 at one end. At its other end, the feedback return line hose 68 is coupled to supply line hose 20 as shown in FIGS. 2 and 3.

When activated, the by-pass valve 66 closes, thus providing a closed loop circulation and, in effect, sends fluid traveling through the return line hose 22 into the feedback return line hose 68 and back into the supply line hose 20.

Coupled to the feedback return line hose 68 is a second check valve 70 which ensures a desired directional fluid flow back into the supply line hose 20. Similarly, first check valve 46 also works to ensure the proper flow direction of the fluid as it travels from the feedback return line 68 back into return line hose 20.

Figure 3:
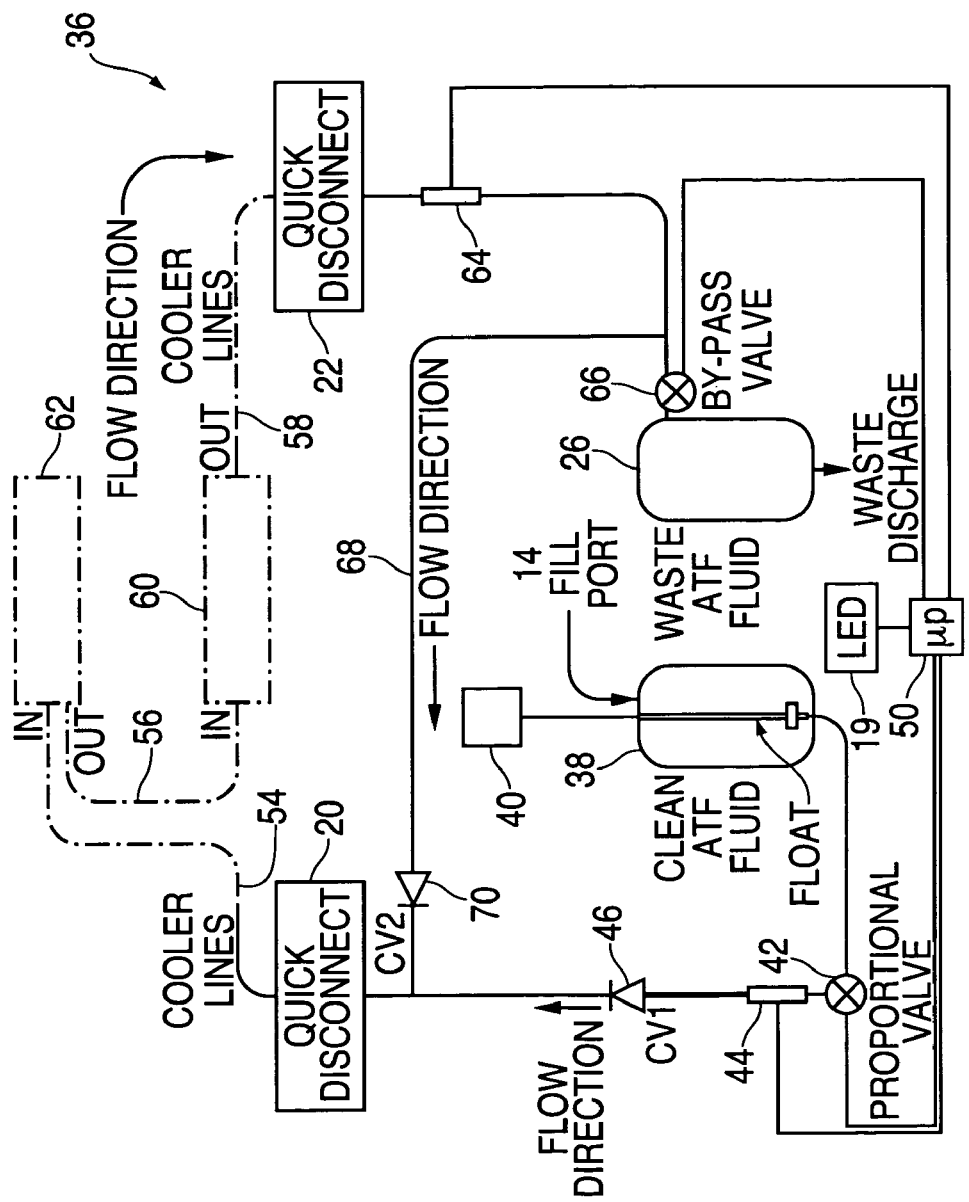
FIG. 3 is a block diagram of the connection of the feed hoses during an alternative setup of the fluid exchanging system of FIG. 1.

It is noted that the arrangement of the transmission and cooling system may be interchanged as depicted in FIG. 3. Here, an illustrative set-up connection is depicted for performing a method of another preferred embodiment of the invention. In this arrangement, all the components are set up as depicted in FIG. 2 with the exception of the transmission system and the cooling system being interchanged. Hence, the supply line hose 20 of the device connects into the line in side 54 of the cooling system 62. The line out side of the cooling system 62 connects 56 to the line in side of the transmissions system 60, and the line out side 58 of the transmission system 60 connects to the return line hose 22 of the device 10.

When the device operates in the fluid exchange mode, compressed air is supplied to pressurize ATF in the supply tank to generate a fluid flow into the supply line hose 20, through the transmission and cooling system, and into the return line hose. Ideally, a constant fluid flow rate is desirable through the transmission system during the fluid exchange, because there is significantly less opportunity for the transmission to overheat due to an insufficient supply of ATF fluid. Furthermore, requiring a constant fluid flow rate helps to ensure that old ATF is being constantly replaced with fresh ATF.

Accordingly, the device of the present invention maintains a constant fluid flow rate through the fluid supply line hose 20 such that it is equal to the fluid flow rate through the return line hose 22 during the fluid exchange process. The manner by which this is done includes the device 10 monitoring the fluid flow of ATF through the supply line hose and the return line hose during the fluid exchange process. This is accomplished by the first flow transducer 44 measuring the fluid flow rate through the supply line hose 20 and sending the measurement to the processor 50. The second flow transducer 64 measures the fluid flow rate through the return line hose 22 and, again, sends this measurement to the processor 50.

The processor 50 compares the measured fluid flow rate values from the supply line hose 20 and return line hose 22 to check whether the flow rates are comparable. The processor is further capable of relaying all fluid flow rate measurement values to a connected LED display 19 for an operator to read. Should the values from both the supply and return line hoses not be the same (e.g., in an instance wherein the fluid flow rate measurement taken through the supply line hose 20 is greater than or less than the fluid flow rate measurement taken through the return line hose 22), the processor 50 instantaneously signals the proportional flow control solenoid 42 to adjust the fluid flow rate accordingly by either restricting or opening the fluid flow through the supply line hose.

Hence, in fluid exchange mode operation, the device's processor 50 continuously receives measured fluid flow rates from the first and second flow transducers 44, 64. Additionally, processor 50 continuously monitors whether the aforementioned fluid flow rates are unequal. If the difference in flow rates is more than a predetermined amount (which may be zero), the processor 50 signals the proportional flow control solenoid 42 to be activated in order to make the necessary adjustments to the fluid flow through the supply line hose 20 to compensate for the return line hose's 22 measured fluid flow rate.

As mentioned above, the device 10 also monitors the fluid supply level in the supply tank 38, for instance, by an internal float level indicator device. The LED display 19 is configured to exhibit the fluid supply level information as it is sent from the processor 50.

Normally, the device 10 operates in a configuration to deliver ATF from the supply tank 38 through the supply line hose 20 and directly into attached waste receptacle 26 via return line hose 22. However, should the device 10 detect a low fluid level in the supply tank 38, the device is equipped with an automatic feature to enable a closed loop feedback return line 68 which effectively couples the return line hose 22 back into the supply line hose 20.

Upon detection of a low fluid supply level in the supply tank 38, the processor 50 activates the by-pass valve 66 to close, thereby directing fluid flowing through return line 22 into feedback return line 68. Thus a closed loop circulation is created back into the supply line hose 20. The feedback return line 68 feature provides an important safety element by ensuring that the transmission does not run out of ATF supply during the fluid exchange operation.

By monitoring not only the fluid flow rate levels in the prescribed manner, but also supervising the available supply of ATF fluid and, furthermore, compensating this supply in cases of lower ATF fluid levels, the invention provides a substantially fail-safe method and apparatus for exchanging transmission fluid safely in a manner more complete than that of the prior art.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of exchanging fluid in a transmission system, comprising:

providing a fluid supply;

connecting a fluid supply line from the fluid supply to the transmission system;

coupling a first check valve to the supply line to regulate a direction of fluid flow through the supply line;

coupling a proportional flow control solenoid to the supply line to adjust fluid flow through the supply line;

pressurizing the fluid supply to create a fluid flow into the transmission system through the fluid supply line;

measuring a first fluid flow rate prior to the fluid flow entering the transmission system;

measuring a second fluid flow rate after the fluid leaves said transmission system;

comparing the first and second fluid flow rates to find a difference between the first and second flow rates;

determining whether the difference between the first and second fluid flow rates exceeds a predetermined value; and adjusting the first fluid flow rate if the difference exceeds the predetermined value.

2. The method of claim 1 further comprising:

repeating the measuring, comparing, determining, and adjusting steps.

3. The method of claim 1, wherein the adjusting step comprises utilizing the proportional flow control solenoid to adjust the first fluid flow rate.

4. The method of claim 1, wherein the process step comprises measuring the fluid flow rates with the flow transducer.

5. A fluid exchanging device for use with a transmission system, comprising:

means for supplying fluid;

means for connecting fluid supply means to the transmission system;

means for regulating a direction of fluid flow through the connecting means, said regulating means further coupled to said connecting means;

means for adjusting fluid flow through the connecting means, said adjusting means further coupled to said connecting means;

means for pressurizing the fluid supply to create a fluid flow into the transmission system through the connecting means;

means for measuring a first fluid flow rate prior to the fluid flow entering said transmission system;

means for measuring a second fluid flow rate after the fluid leaves said transmission system;

means for comparing the first and second fluid flow rates to find a difference between the first and second flow rate;

means for determining whether the difference between the first and second fluid flow rates exceeds a predetermined value; and means for adjusting the first fluid flow rate if the difference exceeds the predetermined value.

6. The device of claim 5 further comprising:

means for repeating the measuring, comparing, determining, and adjusting steps if the determination is not acceptable.

7. A cooling system fluid exchange apparatus for use with a fluid supply tank, a waste receptacle, and a system comprising one of a cooling system or a transmission system comprising:

a fluid supply line capable of supplying fluid from the fluid supply tank to the system;

a fluid return line capable of directing fluid from the system to the waste receptacle;

a first check valve coupled to the supply line that regulates a direction of fluid flow through the supply line;

a proportional flow control solenoid coupled to the supply line that adjusts fluid flow through the supply line;

a first flow transducer attached to the supply line that measures a supply flow rate; a second flow transducer attached to the return line that measures a return flow rate; and a processor connected to said first and second flow transducers that processes the supply and return flow rates.

8. The apparatus of claim 7 further comprising an LED display connected to said processor that indicates at least one of the first flow rate, second flow rate or difference on the LED display.

9. The apparatus of claim 7 further comprising an LED display connected to said processor that indicates at least one of the first flow rate, second flow rate or difference on the LED display.

10. The apparatus of claim 7, wherein the system is a transmission oil cooler.

11. The apparatus of claim 7 further comprising a housing having at least one tray.

12. The apparatus of claim 7 further comprising a housing having wheels.

13. The apparatus of claim 7 further comprising a housing having at least one handle.

14. The apparatus of claim 7, wherein the fluid is transmission fluid.

15. The apparatus of claim 7 further comprising a feedback return line that receives fluid from the fluid return line and returns the fluid into the fluid supply line.

16. The apparatus of claim 15, wherein the feedback return line is coupled to the fluid supply line and the fluid return line.

17. The apparatus of claim 16 further comprising a by-pass valve in the feedhole return line.

18. A fluid exchange apparatus for use with a system that is one of a transmission system or a transmission fluid cooling system, comprising:

a fluid supply tank;

a controlled air pressure system that pressurizes the supply tank;

a fluid supply line connected to the supply tank that feeds fluid to the system;

a first check valve coupled to the supply line that regulates a direction of fluid flow through the supply line;

a proportional flow control solenoid coupled to the supply line that adjusts fluid flow in the supply line;

a first flow transducer coupled to the supply line that determines at least one supply fluid flow rate measurement;

a fluid return line that receives fluid from the cooling system;

a second flow transducer coupled to the return line that determines at least one return fluid flow rate measurement; and a processor connected to the first and second flow transducers and said proportional flow control solenoid, wherein the processor receives the supply and return flow rate measurements and controls the proportional flow control solenoid.

19. The apparatus of claim 18 further comprising:

a feedback return line that receives fluid from the fluid return line and returns the fluid into the fluid supply line.

20. The apparatus of claim 19, wherein the feedback return line is coupled to the fluid supply line and the fluid return line.

21. The apparatus of claim 20 further comprising a by-pass valve in the feedback return line.

22. The apparatus of claim 18 further comprising a waste receptacle connected to the return line.

23. The apparatus of claim 18, wherein the system is a transmission oil cooler.

24. The apparatus of claim 18, wherein the fluid is transmission fluid.

* * * * *